United States Patent
Boomgaard

[11] 3,898,550
[45] Aug. 5, 1975

[54] POWER CONTROL CIRCUIT

[75] Inventor: Dirk J. Boomgaard, Monroeville, Pa.

[73] Assignee: Westinghouse Electric Corporation, Pittsburgh, Pa.

[22] Filed: July 12, 1974

[21] Appl. No.: 487,942

[52] U.S. Cl. ............... 321/16; 307/235 R; 321/47
[51] Int. Cl. .......................................... H02p 13/24
[58] Field of Search .............. 321/5, 16, 18, 38, 40, 321/42, 47; 307/228, 235 R, 252 N, 252 Q, 252 UA; 328/151

[56] References Cited
UNITED STATES PATENTS

| | | | |
|---|---|---|---|
| 3,419,784 | 12/1968 | Winn | 321/47 |
| 3,525,032 | 8/1970 | Torok | 321/38 |
| 3,551,778 | 12/1970 | Ekstrom | 321/38 |
| 3,590,277 | 6/1971 | South | 307/228 |
| 3,621,373 | 11/1971 | Mitchell | 321/5 |
| 3,746,966 | 7/1973 | Torok et al. | 321/40 |
| 3,792,339 | 2/1974 | Kublick | 321/40 |
| 3,808,466 | 4/1974 | Campbell | 307/235 R |
| 3,813,594 | 5/1974 | Toth | 321/47 |
| 3,836,790 | 9/1974 | Becker | 307/235 R |

*Primary Examiner*—William H. Beha, Jr.
*Attorney, Agent, or Firm*—J. J. Wood

[57] ABSTRACT

A power control circuit is disclosed for supplying an output pulse train for controlling the firing of a thyristor power modulator, one control circuit and one power modulator being interconnected in each phase of a pholyphase electrical machine or transformer. A comparator having inverting and non-inverting inputs, is provided. A resistor-capacitor circuit is connected to a d.c. source through a first switch, the magnitude of the d.c. source being a function of the desired angle of conduction for the thyristors. The capacitor is connected in parallel with the first switch and with the inverting input. A variable d.c. control voltage is connected to the non-inverting input through a second switch, the selected control voltage magnitude being a function of the desired angle of conduction for the thyristors. The opening and closing of the switches in unison and in timed sequence causes the comparator to deliver a pulse train to control the gating of the respective thyristors.

8 Claims, 3 Drawing Figures

3,898,550

POWER CONTROL CIRCUIT

BACKGROUND OF THE INVENTION

1. Field of the Invention

The present invention relates to a power control circuit for supplying an output pulse train for controlling the firing sequence of a plurality of thyristors.

2. Description of the Prior Art

The development of the thyristor or silicon controlled rectifier (SCR) has created seemingly unlimited possibilities for the control of power from an a.c. supply by electronic techniques. Essentially, in these applications, the thyristor functions as a synchronized chopper with a controllable angle of conduction.

One prior art patent, U.S. Pat. No. 3,584,286 to Randall discloses a phase shift circuit utilized with a three phase recitifier system. A frequency three times the fundamental is generated, clipped and passed through an integrator to provide a sinusoidal voltage which is then amplified and limited to provide an alternating square wave at three times the fundamental frequency. Ramp voltages are developed with reset to zero at intervals in accordance with the square wave of voltage. The ramp voltages are compared with a variable d.c. voltage to provide a phase shiftable initiation point for rectangular blocks of voltage to control the gating of the thyristors in the recitifier system.

The present invention independently controls each phase of a polyphase power system. If any phase of the power supply shifts, the control circuit will move in unison.

SUMMARY OF THE INVENTION

The instant invention provides a power control circuit for supplying an output pulse train for controlling the gating of a thyristor power modulator, one circuit and one modulator being interconnected in each phase of a polyphase electrical machine or transformer. Comparator means having an output and dual inputs: inverting and non-inverting are provided. A resistor capacitor circuit is connected to a d.c. source through a first switching means; the magnitude of d.c. source is a function of the desired angle of conduction for the thyristors. The capacitor is connected in parallel with the first switching means and with said inverting input. A variable d.c. control voltage is connected to said non-inverting input through a second switching means, the magnitude of the selected d.c. control voltage being a function of the desired angle of conduction. Means are arranged for disciplinal operation of the opening and closing of said switching means in unison and in timed sequence, whereby the comparator delivers an output gating pulse train which is a function of the desired angle of conduction for said thyristors respectively.

DESCRIPTION OF AN EXEMPLARY EMBODIMENT

Figure 1:
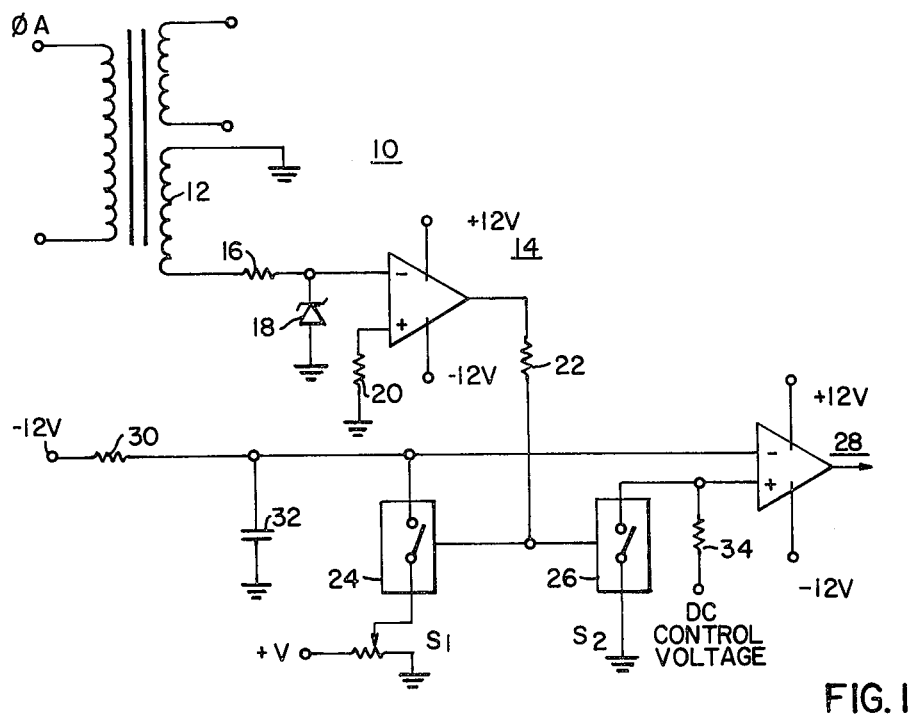
FIG. 1 is an electrical schematic of the power control circuit of the instant invention.

The power control circuit of the invention is indicated generally at 10. One phase, $\phi_A$, of a three phase supply transformer, is supplied to the transformer secondary 12, one side of which is grounded as shown. The voltage of the secondary 12, as applied to a comparator indicated generally at 14, through a voltage divider comprising: resistor 16 and Zener diode 18.

The comparator 14 is an operational amplifier having an inverting input (−) which is connected to the junction of 16–18 and a non-inverting input (+) which is connected to ground through resistor 20.

The output of the comparator 14 is applied through resistor 22 to control switches 24 ($S_1$) and 26 ($S_2$). The switches are indicated symbolically in the interests of similarity; in the practical embodiment units 24 and 26 are type CD4016 COS/MOS quad bilateral switches. The switch 24 is connected at one end to a +V source (which in this embodiment is +5V), while switch 26 is grounded at one end.

A comparator indicated generally at 28, is an operational amplifier having an inverting input (−) and a non-inverting input (+). An RC circuit comprising resistor 30 and capacitor 32 is connected to the inverting input (−). A control voltage is connected to the non-inverting input + through a resistor 34.

OPERATION OF THE EXEMPLARY EMBODIMENT

A sine wave (FIG. 2A) attenuated by the voltage divider action of 16 and 18 is applied to the comparator 14. The + input is at zero. At the zero crossing of the sine wave the comparator delivers an output (FIG. 2B) which is a square wave moving between +12V and −12V.

Figure 2:
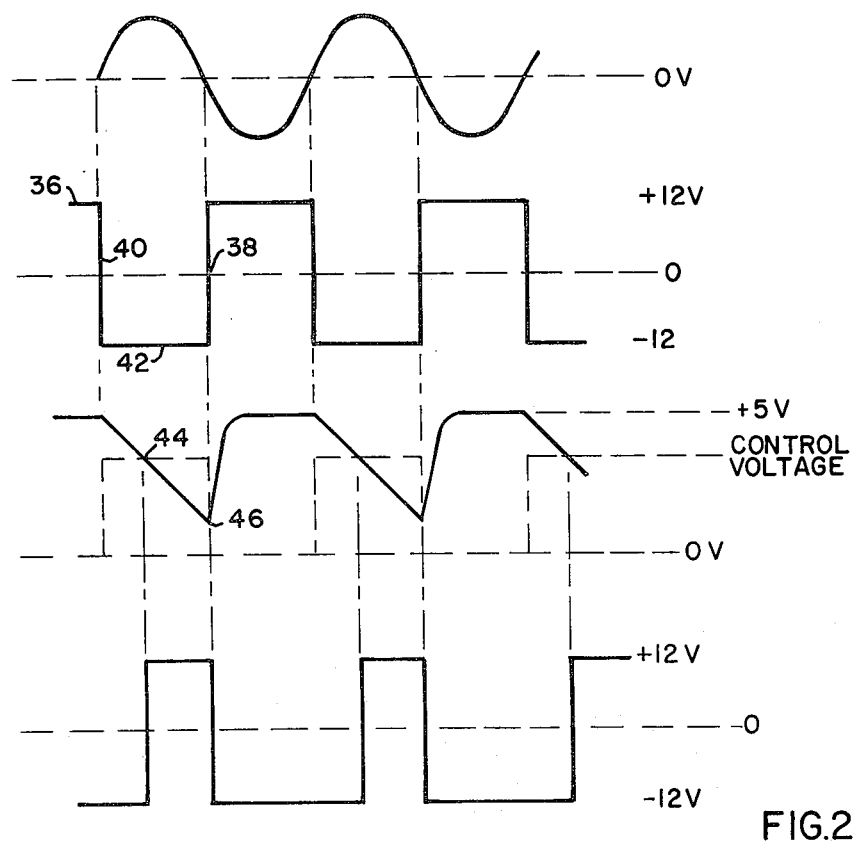
FIGS. 2a, 2b, 2c and 2d are voltage waveforms used in explaining the operation of the control circuitry of FIG. 1.

Referring now to FIG. 2B, the square wave controls the opening and closing of switches 24, 26. At 36 and 38 the switches are closed, at 40, 42 the switches are open.

When switch 24 ($S_1$) is closed, the capacitor 32 charges to +5V. With switch 26 closed, the d.c. control voltage signal is shorted to ground and the output of the comparator 28 is at −12V. When the switches 24, 26 open, the control voltage is applied to the + input of the comparator 28 and the capacitor 32 begins to discharge or ramp down. The output of the comparator is at −12V until the point 44 where the ramp crosses the positive control pulse. The small change in voltage (−ΔV) is amplified and inverted and the comparator output instantaneously jumps to +12V. At 38 (FIG. 2B), the switches 24, 26 close, and capacitor 32 begins to charge up to +5V. At point 46 the small change in voltage (+ΔV) is amplified and inverted and the comparator output jumps to −12V. The process is repetitive producing the square wave shown in FIG. 2D.

FIG. 3 EMBODIMENT

Figure 3:
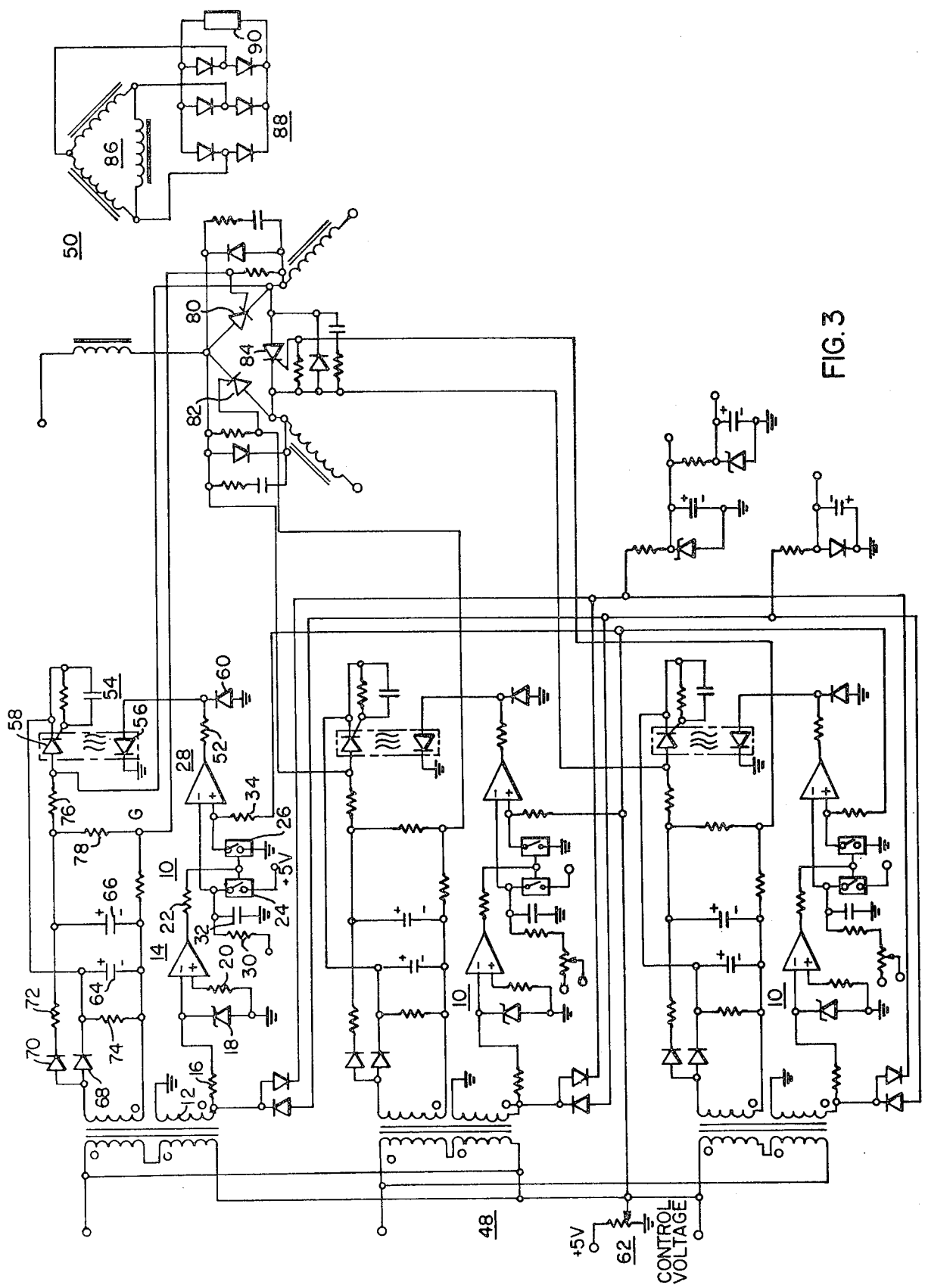
FIG. 3 is an electrical schematic illustrating the utilization of the power control circuitry of the invention to control the output of a three phase power transformer.

In FIG. 3, the one power control circuit 10 is connected in each phase of a power supply 48 for the purpose of controlling power of a three phase power transformer indicated generally at 50.

In the interest of simplicity one $\phi_A$ of power supply 48 will be considered in detail. The same numeration used in the power control circuit of FIG. 1 has been retained in FIG. 3 to identify similar components.

The output of the power control circuit is applied through resistor 52 to an opto-electrical isolator indicated generally at 54, which is of a type MCS2 manufactured by the Monsanto Company. The module 54 contains a light emitting diode (LED) 56 in proximity to a light actuated silicon controlled rectifier (LASCR) 58. A blocking diode is identified at 60. The d.c. control voltage for the power control circuits 10 is identified at 62. Capacitors 64, 66 are charged through diodes 68, 70 respectively.

Completing the description of this portion of the circuitry resistors are identified at 72, 74, 76 and 78. An R-C circuit interconnects the control grid and cathode of LASCR 58. The ends of resistor 78 are marked K and G which corresponds to the cathode and grid of the power rated SCR 80 which is in one phase of the primary power transformer 50. Power rated SCR's 82 and 84 are controlled by the power control circuitry 10 in $\phi_B$ and $\phi_C$ of power supply 48. The secondary 86 of the transformer is connected to a three phase bridge rectifier 88 to supply d.c. power to load 90.

OPERATION OF FIG. 3

When no current is flowing through LED 56, LASCR 58 is non-conducting, the capacitors 64, 66 are charged. The potential of capacitor 66 further insures that SCR 80 will not fire.

In order to turn on or render LASCR 58 conductive, it is necessary to supply an enabling potential across the anode-cathode concurrently with the impingement of light on its light sensitive surface. In the FIG. 3 embodiment, the enabling potential is supplied by capacitors 64, 66.

When LED 56 conducts, light strikes LASCR 58 and it conducts heavily. A positive pulse is applied to the control grid of the power rated SCR 80 and it conducts. The LASCR 58 quickly drops below the holding current level and is extinguished.

I claim as my invention:

1. A power control circuit for supplying an output pulse train for controlling the firing of a thyristor power modulator, one circuit and one modulator being interconnected in each phase of a polyphase electrical machine or transformer, comprising:
   a. first comparator means having an output and dual inputs: inverting and non-inverting;
   b. first and second switching means having open and closed positions;
   c. a resistor-capacitor circuit, connected to a d.c. source through said first switching means the magnitude of said source being a function of the desired angle of conduction for the thyristors in said power modulator, said capacitor being in parallel with said first switching means and with said inverting input;
   d. a variable d.c. control voltage source connected to said non-inverting input through said second switching means, the selected d.c. control voltage magnitude being a function of the desired angle of conduction for the thyristors in said power modulator;
   e. means for disciplinal operation of the opening and closing of said switching means, in unison and in timed sequence, whereby said first comparator delivers on its output a pulse train which is a function of said desired angle of conduction.

2. A power control circuit according to claim 1 wherein said first comparator means is an operational amplifier.

3. A power control circuit according to claim 1 wherein:
   said variable d.c. control voltage source comprise a potentiometer connected between a fixed d.c. source and ground, and having a sliding contact the position of which with respect to ground, defines said select d.c. control voltage.

4. A power control according to claim 1 wherein:
   said disciplinary means comprises a second comparator means having an output and dual inputs: inverting and non-inverting, the inverting input being connected to an a.c. source, the non-inverting input being connected to a reference electrical source, whereby the compared inputs produce a second comparator output for controlling the opening and closing of said switching means.

5. A power control circuit according to claim 4 wherein:
   said second comparator means is an operational amplifier.

6. A power control circuit for supplying an output pulse train for controlling the firing of a thyristor power modulator, one circuit and one power modulator being interconnected in each phase of a polyphase electrical machine or transformer comprising:
   first comparator means having an output and dual inputs: inverting and non-inverting;
   first and second switching means having opened and closed positions;
   a potentiometer having a sliding contact and being connected between a d.c. source and ground;
   a resistor and a capacitor serially connected with said first swiching means and said sliding contact, said capacitor being in parallel with said first switching means and with said inverting input of said first comparator means;
   a d.c. control voltage serially connected with said second switching means, the serial combination being connected to said non-inverting input of said first comparator means;
   second comparator means having dual inputs: inverting and non-inverting, and an output, said inverting input being connected to an a.c. source, said non-inverting input being connected to a reference voltage source, the compared output of said second comparator means being applied to said first and second switching means for operating the opening and closing of said switching means in unison and in timed sequence; whereby the output of said first comparator means as a result of said opening and closing of said switching means delivers an output pulse train which is a function of the desired angle of conduction for said thyristors in said power modulator.

7. A power control circuit according to claim 6 wherein:
   said first and second comparator means are operational amplifiers.

8. A power control circuit according to claim 6 wherein:
   said d.c. control voltage comprises a potentiometer having a sliding contact, said potentiometer being connected between a d.c. source and ground, the magnitude of the d.c. control voltage between said sliding contact and ground being a function of the desired angle of conduction for said thyristors in said power modulator.

* * * * *